US009244578B2

(12) United States Patent
Liu

(10) Patent No.: US 9,244,578 B2
(45) Date of Patent: Jan. 26, 2016

(54) DETECTING GESTURES ON THE SIDE OF A COMPUTING DEVICE

(71) Applicant: INTEL CORPORATION, Santa Clara, CA (US)

(72) Inventor: Min Liu, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 69 days.

(21) Appl. No.: 14/128,562

(22) PCT Filed: Sep. 12, 2013

(86) PCT No.: PCT/US2013/059537
§ 371 (c)(1),
(2) Date: Dec. 20, 2013

(87) PCT Pub. No.: WO2015/038133
PCT Pub. Date: Mar. 19, 2015

(65) Prior Publication Data
US 2015/0145805 A1 May 28, 2015

(51) Int. Cl.
G06F 3/044 (2006.01)
G06F 3/01 (2006.01)
(Continued)

(52) U.S. Cl.
CPC .............. *G06F 3/044* (2013.01); *G06F 1/1692* (2013.01); *G06F 3/01* (2013.01); *G06F 3/041* (2013.01); *G06F 3/0418* (2013.01); *G06F 2203/04108* (2013.01)

(58) Field of Classification Search
CPC ... G06F 3/0488; G06F 3/04883; G06F 3/044; G06F 3/04886; G06F 3/045; G06F 3/041; G06F 1/1692; G06F 3/0418; G06F 2203/04108; G06F 1/16
See application file for complete search history.

(56) References Cited

U.S. PATENT DOCUMENTS

2009/0284496 A1* 11/2009 Oki ............................... 345/174
2010/0026656 A1* 2/2010 Hotelling et al. ............. 345/174
(Continued)

FOREIGN PATENT DOCUMENTS

KR 10-2009-010610 A 10/2009
WO WO 2007-112172 A1 10/2007
WO WO 2013-126098 A1 8/2013

OTHER PUBLICATIONS http://www.azoteq.com/technology/capacitive.html—ProxSense Capacitive Proximity & Touch Switches, 3 pages, web paged accessed Apr. 17, 2014.

(Continued)

*Primary Examiner* — Saiful A Siddiqui
(74) *Attorney, Agent, or Firm* — Schwabe, Williamson & Wyatt, P.C.

(57) ABSTRACT

Embodiments of apparatus and methods for detecting gestures are described. In embodiments, an apparatus may include a transmitter-receiver electrode arrangement to generate an electric field projecting beyond a side of a computing device, so that changes to the electric field caused by user gestures on or near the outer surface of the side may be sensed. The transmitter-receiver electrode arrangement may include at least a transmitter and a receiver that are different, but complementary in geometry and disposition, disposed relative to an inner surface of the side of the computing device. Moreover, a capacitive sensor may be disposed in the computing device to output electrical signals indicative of changes to the electric field sensed. Other embodiments may be described and/or claimed.

22 Claims, 7 Drawing Sheets

(51) Int. Cl.
  *G06F 3/041* (2006.01)
  *G06F 1/16* (2006.01)

(56) References Cited

U.S. PATENT DOCUMENTS

2011/0205172 A1    8/2011   Kitada
2012/0200524 A1*   8/2012   Vallis et al. .................. 345/174
2012/0249476 A1   10/2012   Schwartz et al.
2013/0176236 A1*   7/2013   Ivanov .......................... 345/173

OTHER PUBLICATIONS http://www.azoteq.com/products/modules.html—ProxSense Proximity & Touch Moudules, 1 page, web paged accessed Apr. 17, 2014.
http://www.microchip.com/pagehandler/en-us/technology/mtouchbuttons/technology/home.html, Capacitive-Touch—Proximity, Keys and Sliders_Microchip Technology Inc., 1 page, web paged accessed Apr. 17, 2014.
http://www.microchip.com/pagehandler/en-us/technology/mtouchscreens/products.html, Products—Touch Screen and Touch Pad Controllers_Microchip Technology Inc., 1 page, web page accessed Apr. 17, 2014.
Bruce Bohn, "Microchip CTMU for Capacitive Touch Applications", 2009, 22 pages, Microchip Technology Inc.
Keith Curtis et al., "mTouch Metal Over Cap Tachnology", 2010, 8 pages, Microchip Technology Inc.
http://www.synaptics.com/en/capacitive-sensing.php—An Introduction to Capacitive Sensing Technology, 1 page, web page accessed Apr. 17, 2014.
International Search Report and Written Opinion mailed May 29, 2014 for International Application No. PCT/US2013/059537, 13 pages.

* cited by examiner

DETECTING GESTURES ON THE SIDE OF A COMPUTING DEVICE

CROSS REFERENCE TO RELATED APPLICATIONS

The present application is a national phase entry under 35 U.S.C. §371 of International Application No. PCT/US2013/059537, filed Sep. 12, 2013, entitled "DETECTING GESTURES ON THE SIDE OF COMPUTING DEVICE", which designated, among the various States, the United States of America. The Specification of the PCT/US2013/059537 Application is hereby incorporated by reference.

FIELD OF THE INVENTION

The present disclosure relates generally to the technical field of computing, and more particularly, to apparatuses and methods for detecting gestures on the side of a computing device.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

Many mobile devices may be equipped with mechanical switches or buttons on the sides, sometimes along the metal band, to provide various control functions, such as power on/off, volume up/down, etc. Similarly, many modern mobile devices may be equipped with touch sensing technologies (e.g., virtual buttons of home, back, menu, etc.) in the front to provide various control functions. Capacitive sensing is a touch sensing technology based on capacitive coupling that may use human body capacitance as input.

Many mobile devices may use a metal band at the outside edges as a design feature to improve the durability and aesthetical value of the products. In many occasions, the metal band may be made as part of the wireless antenna system to improve wireless reception of the mobile device. However, existing touch sensor designs cannot be used for replacing mechanical switches on the sides of mobile devices, for example, due to the interference from the conductive metal band.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
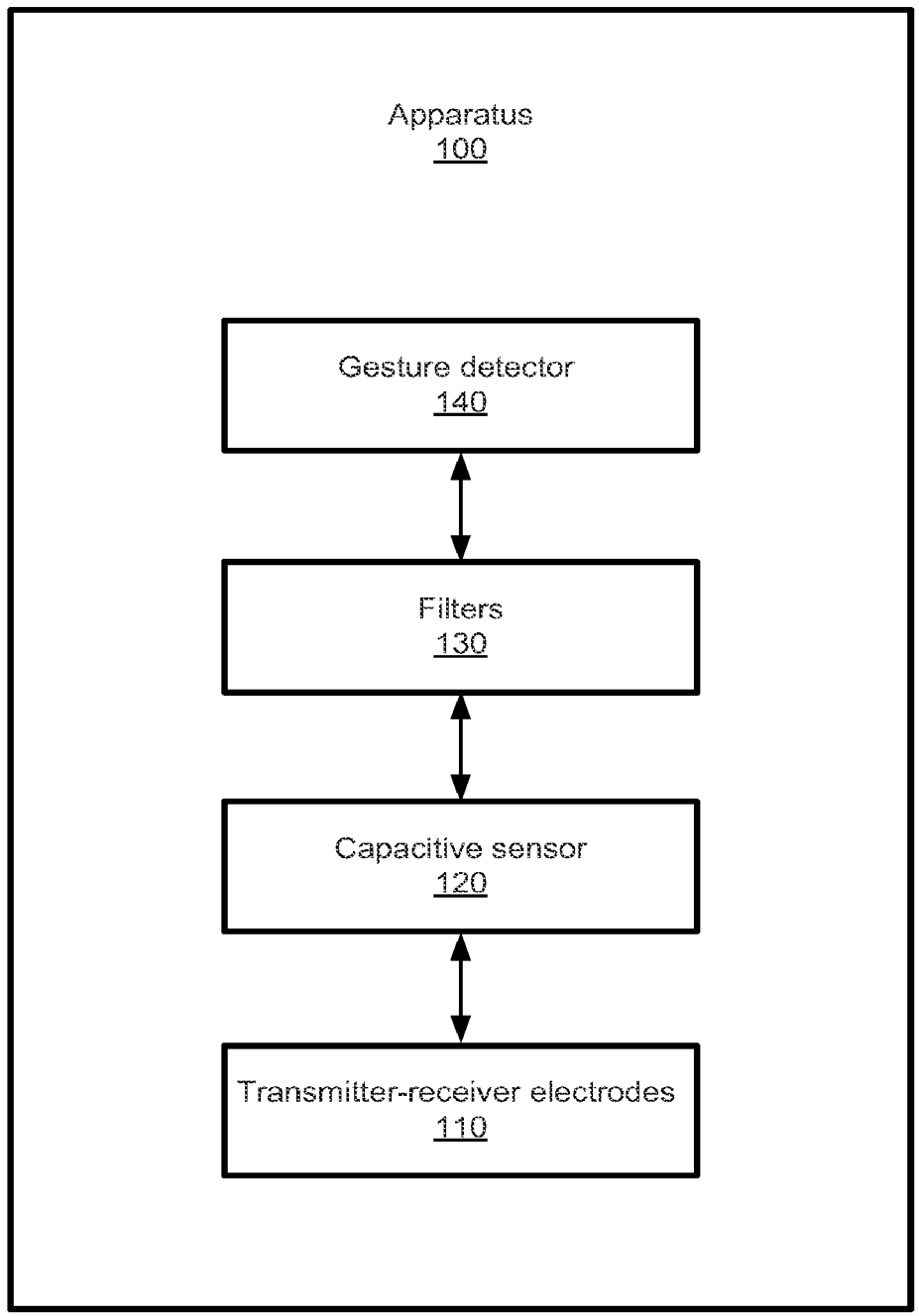
FIG. 1 is a schematic diagram illustrating an example apparatus for detecting gestures on the side of a computing device, incorporating aspects of the present disclosure, in accordance with various embodiments.

Embodiments of apparatus and methods for detecting gestures on the side of a computing device are described herein. In embodiments, an apparatus may include a transmitter-receiver electrode arrangement to enable an electric field projecting beyond the side of a computing device, such as a smartphone, so that changes to the electric field caused by user gestures on or near the outer surface of the side may be sensed. The transmitter-receiver electrode arrangement may include at least a transmitter and a receiver that are different, but complementary in geometry and disposition, disposed relative to an inner surface of a side of the computing device. Moreover, a capacitive sensor may be disposed in the computing device, electromagnetically coupled with the transmitter-receiver electrode arrangement, to output electrical signals indicative of changes to the electric field sensed. In embodiments, the apparatus may be the computing device. These and other aspects of the present disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in one embodiment," "in an embodiment," "in another embodiment," "in embodiments," "in various embodiments," or the like, which may each refer to one or more of the same or different embodiments. Furthermore, the terms "comprising," "including," "having," and the like, as used with respect to embodiments of the present disclosure, are synonymous.

In embodiments, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. In embodiments, a module may be implemented in firmware, hardware, software, or any combination of firmware, hardware, and software.

Referring now to FIG. 1, an example apparatus for detecting gestures on the side of a computing device, in accordance with various embodiments, is illustrated. In embodiments, apparatus 100 may include transmitter-receiver electrodes 110, working as the front end of the capacitive sensor 120 for detecting the change of capacitance introduced by a human body near transmitter-receiver electrodes 110. Moreover, apparatus 100 may include filters 130 which may enable the further processing of signals generated by capacitive sensor 120, such as filtering out various noises from the signals. Furthermore, apparatus 100 may include gesture detector 140 to determine a user gesture based at least in part on the signals after being processed using filters 130.

In embodiments, transmitter-receiver electrodes 110 may include at least one transmitter electrode (Tx) and one receiver electrode (Rx), and may include additional transmitter electrodes and receiver electrodes. The transmitter and receiver electrodes may be different but complementary in geometry and disposition, disposed relative to an inner surface of a side of the computing device. In embodiments, the side may have a metal band disposed thereon, and the side may be a lateral side, a top side or a bottom side. In various embodiments, transmitter-receiver electrodes 110 may have a particular body and shape, disposed in a particular arrangement inside a computing device, configured to enable an electric field to be projected beyond a side of a computing device, including the metal band, if one is disposed on the side. Therefore, changes to the electric field caused by user gestures on or near the outer surface of the side may be sensed, including when a metal band is disposed on the side. For ease of understanding, the remaining description will be primarily presented in the context of detecting user gestures on a lateral side of a computing device, having a metal band disposed thereon. However, as noted earlier, the illustrative context is not meant to be limiting on the present disclosure, which may be practiced on any side, with or without a metal band disposed thereon.

In embodiments, capacitive sensor 120 may be used for capacitive sensing based on capacitive coupling. Transmitter-receiver electrodes 110 may be integrated into capacitive sensor 120. In one embodiment, the driver electronics of capacitive sensor 120 or an excitation voltage may continually charge the capacitor coupled by the transmitter/receiver electrodes. The amount of charging may be measured by capacitive sensor 120 to reflect the amount of capacitance between the transmitter electrode and the receiver electrode. By measuring the changes of the capacitance coupled by the Tx/Rx electrodes, the changes to the electric field caused by user gestures on or near the outer surface of the side metal band may be detected. As an example, when a finger approaches the transmitter/receiver electrodes, the electric field may be changed, and this change may cause the increased charging time of the Tx/Rx.

In embodiments, filters 130 may be used for processing signals output by capacitive sensor 120. Electrodes, enhanced with the teachings of the present disclosure, may enable an electric filed to extend beyond the side, even when a metal band is disposed thereon, and hence allow great sensing distance. In some embodiments, the metal band, when present, may become an antenna structure that captures surrounding capacitance that may be coupled back to the actual sensor electrodes. Such designs of electrode arrangement may have increased sensitivity, but prone to noise interference and false detection. In embodiments, signals output by capacitive sensor 120 may be processed using filters 130 to filter out various noises, jitters, unintended touches, etc. so that false positive signals may be eliminated and true positive signals may be retained, cleaned, and detected. In embodiments, filters 130 may be implemented in hardware, firmware, software, or any combination of hardware, firmware, and software.

In embodiments, gesture detector 140 may be used for detecting user gestures on the side of a computing device based on the signals captured by capacitive sensor 120 and processed using filters 130. In embodiments, gesture detector 140 may be implemented in hardware, firmware, software, or any combination of hardware, firmware, and software. In embodiments, a particular user gesture may have its corresponding signature of signal pattern. Thus, gesture detector 140 may infer a user gesture based on a detected signal pattern. In various embodiments, multiple receiver electrodes may generate signals in multiple channels. Two or more signal channels may be used to identify a signal pattern in a multi-dimensional space with directionality. As an example, two receiver electrodes may be coupled with one transmitter electrode to enable the detection of a gesture of finger sliding on the side of the computing device, including the direction and distance of the gesture of finger sliding. As another example, the similar electrodes design may enable the detection of a gesture of finger tapping on the side of the computing device, including the location and frequency of the gesture of finger tapping.

Enhanced with the present disclosure, a computing device with metal bands along any side (top, bottom, front, back, left, right, etc.) of the computing device may be made without any mechanical switch/button on the side of the computing device. Further enhanced with the present disclosure, a computing device may enable additional functions supported by user gestures performed on the sides of the computing device. As an example, a user may use finger gestures, such as finger sliding or tapping, on the sides of the computing device to control various applications or perform various functions. For instance, a finger sliding gesture may be used to scroll up and down in a browser or zoom in and out in a photo viewer, among many other functions. Resultantly, the industry design of computing devices, particularly mobile devices, may be eased and enriched. User experience for using computing devices may be enhanced. In embodiments, apparatus 100 may be the computing device itself.

Figure 2:
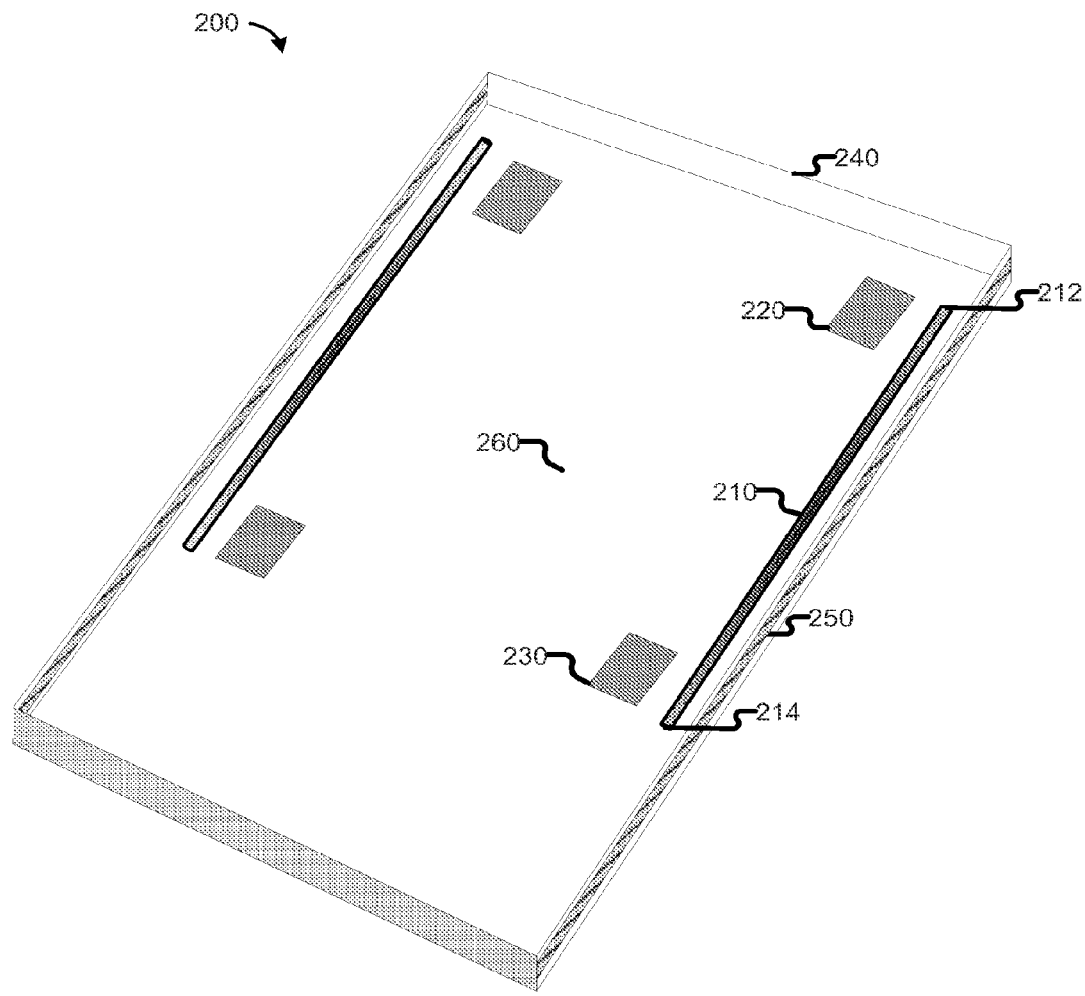
FIG. 2 is a schematic diagram illustrating an example transmitter-receiver electrode arrangement, incorporating aspects of the present disclosure, in accordance with various embodiments.

Referring now to FIG. 2, an example transmitter-receiver electrode arrangement 200, in accordance with various embodiments, is illustrated. In one embodiment, case 240 of a mobile device may have metal band 250 on the side of the case. Transmitter-receiver electrode arrangement 200 may have electrodes disposed on case 240. As an example, transmitter-receiver electrode arrangement 200 may have transmitter electrode (Tx) 210 juxtaposed with two receiver electrodes (Rx) 220 and 230 on back cover 260. In other embodiments, transmitter-receiver electrode arrangement 200 may be arranged differently, e.g., attached to other surfaces or structures of the computing device. Being the front end of capacitive sensor 120, the electrodes for sensing the finger movement outside mental band 250 have a direct impact on the overall performance of apparatus 100. In embodiments, transmitter-receiver electrode arrangement 200 may be so configured to project an electrical field outside mental band 250. In embodiments, transmitter-receiver electrode arrangement 200 may include or work with other components needed, e.g., power supply components, to generate an electric field and project the electrical field outside metal band 250.

In embodiments, the transmitter and receiver electrodes may be made from various materials, such as copper, Indium tin oxide (ITO), printed ink, or any other suitable conductive media or any combination thereinafter. In embodiments, the transmitter and receiver electrodes may be constructed in a particular body and shape to enable the electrical field to be projected beyond the edge of case 240. In some embodiments, transmitter electrode 210 may have an elongated body, such as an elongated wire or tube, or any suitable three-dimensional body structure functionally capable for enabling the electrical field to be projected beyond the edge of case 240. In some embodiments, transmitter electrode 210 may be disposed substantially parallel and adjacent to the inner surface of metal band 250. In some embodiments, transmitter electrode 210 may be disposed just outside the keep-out region that is required when metal band 250 is used in a wireless antenna system of the computing system (not fully shown) enclosed in case 240.

In embodiments, transmitter electrode 210 may be juxtaposed with two receiver electrodes 220 and 230, respectively disposed adjacent to first end 212 and second end 214 of transmitter electrode 210 as shown. Receiver electrodes 220 and 230 may be used to measure and output first and second signals in respective first and second channels to capacitive sensor 120. The first and second signals may reflect respective changes to the electric field outside of metal band 250, near first end 212 and second end 214 of the transmitter electrode. In some embodiments, receiver electrode 220 or 230 may have a body that is substantially planar, and is disposed substantially parallel to back cover 260, or conforming to the shape of back cover 260 (e.g. curved shape). In embodiments, receiver electrodes 220 and 230 may be disposed further inward from the inner surface of metal band 250 than transmitter electrode 210 as shown. In some embodiments, transmitter electrode 210 may be constructed as two separate transmitter electrodes so that each receiver electrode may be paired with its own transmitter electrode. In other embodiments, multiple receiver electrodes may be disposed in multiple locations along the edge of case 240 to achieve more measuring points, signal channels, or distinct sensing areas/segments, thus achieve further precision for capacitive sensing. In yet other embodiments, transmitter and/or receiver electrodes may be placed inside back cover 260, attached to the internal board/frame from the front side assembly (not shown) of case 240, attached to the outside of back cover 260, or embedded inside any suitable location of case 240. In embodiments, one or more of the transmitter/receiver electrodes may be placed on one or more sides of the computing device, enabling user gestures along one or more sides of the computing device, such as left, right, top, bottom, or any side of a polygon shape. In embodiments, a computing device may have a curved shape or an irregular shape. The illustrated example of transmitter-receiver electrode arrangement 200 may then be modified based at least in part on the shape of the computing device so that the electric field between the transmitter and receiver electrodes may be projected beyond the outer shape of the computing device.

In embodiments, when a finger approaches within the proximity of transmitter 210 or receiver electrode 220 or 230, the finger may change the electrical field outside metal band 250. As an example, the capacitor of the finger may take away some of the charges from transmitter electrode 210 and receiver electrode 220. In one embodiment, the change may cause the increased charging time of the transmitter-receiver pair. Such change may be detected by capacitive sensor 120, which may be used to reflect the distance between the finger and receiver electrode 220. The distance between the finger and receiver electrode 230 may be similarly detected. Synthesizing the information from both receiver electrodes 220 and 230, the whereabouts of the finger along metal band 250 may be determined. In embodiments, the measurements from receiver electrodes 220 and 230 may be taken continuously, or in serial or discrete time intervals. Thus, the velocity of the finger movement may also be determined. As an example, signals from receiver electrode 220 may show positive gain while signals from receiver electrode 230 may show negative loss. A signal pattern as such may indicate finger sliding from a position to another position along the metal band 250, moving away from second end 214, but moving towards first end 212. Depending on the actual implementation, the same signal pattern may indicate the exact opposite finger gesture in another embodiment. As another example, signals from both receiver electrodes 220 and 230 may show positive gains or losses. A signal pattern as such may indicate finger tapping, either the upward motion or the downward motion of a finger. The frequency of finger tapping may be determined from the frequency of changes of signals output from these receiver electrodes. Moreover, the location of finger tapping may be determined from the comparison of amplitude or relative strength of signals measured from receiver electrodes 220 and 230, respectively. As an example, finger tapping at a location closer to first end 212 may induce greater impact on signals measured from receiver electrodes 220 than receiver electrodes 230.

Figure 3:
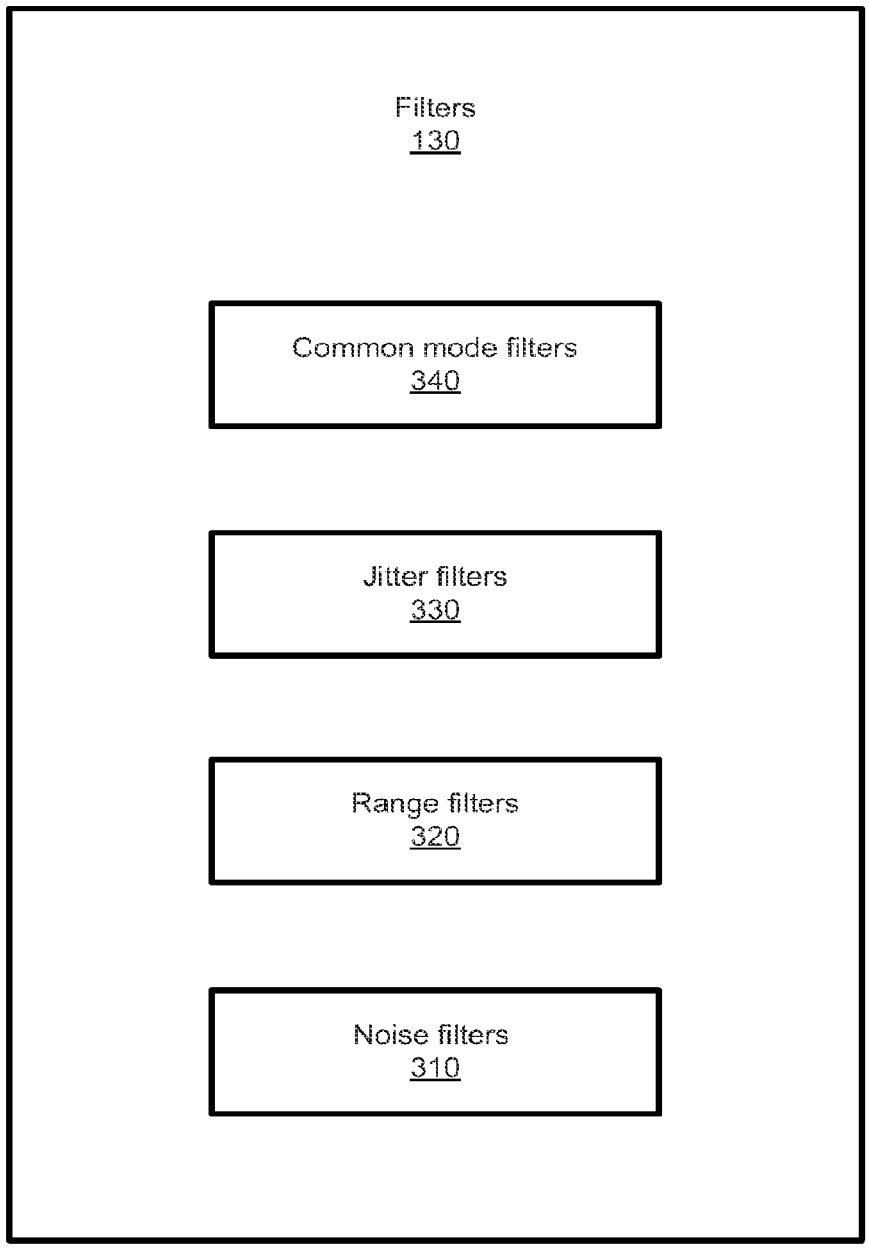
FIG. 3 is a schematic diagram illustrating an example filter configuration, incorporating aspects of the present disclosure, in accordance with various embodiments.

Referring now to FIG. 3, an example filter configuration for detecting gestures on the side of a computing device, in accordance with various embodiments, is illustrated. In embodiments, filters 130 may include noise filter 310, which is able to filter out at least one of the power supply noise, the radio frequency noise, or the sensor measurement noise from the signals output by the capacitive sensor. Filters 130 may further include range filter 320, which is able to filter out the out-of-range noise from the signals output by the capacitive sensor. Filters 130 may further include jitter filter 330, which is able to filter out the jitter noise from the signals output by the capacitive sensor. Filters 130 may additionally include common mode filter 340, which is able to filter out the common mode noise from the signals output by the capacitive sensor.

Filters 130 may include noise filter 310 to filter out or substantially remove the power supply noise from the signals output by capacitive sensor 120. In embodiments, almost all power supplies generate some levels of noise. As an example, switch-mode power supplies generate noise due to their fast switching current transitions, which is also a source of radio interference. Additionally, amplifiers, alternating current (AC) input rectifier/capacitor, etc. may also generate power supply noise, and the noise may be conducted and radiated through the input and output power cords. Thus, noise filter 310 may be used to filter out or substantially remove the power supply noise from the signals output by capacitive sensor 120.

Filters 130 may include noise filter 310 to filter out or substantially remove the radio frequency noise from the signals output by capacitive sensor 120. In embodiments, radio frequency noise may be generated by the power supply sources or many electronics inside the computing device, such as circuits for global positioning system (GPS) or wireless transmission (e.g., WiFi, the third generation (3G) of mobile telecommunications technology, the fourth generation (4G) of mobile telecommunications technology (e.g., long term evolution (LTE)), etc.). The receiver input circuits of capacitive sensor 120 may pick up thermal noise and other electronic noise. Transmitter-receiver electrodes 110 may pick up radiated electromagnetic noise like antennas. Overall, the radio frequency noise may include white noise and other disturbing influences on the signals output by capacitive sensor 120. Thus, noise filter 310 may be used to filter out or substantially remove the radio frequency noise from the signals output by capacitive sensor 120.

Filters 130 may include noise filter 310 to filter out or substantially remove the sensor measurement noise from the signals output by capacitive sensor 120. In embodiments, sensor measurement noise may include any random deviation of the signal or random signals that carry no useful information, such as sensitivity error, exceeding measured range error, non-linearity error, dynamic error, drift error, digitization error, sampling error, etc. Thus, noise filter 310 may be used to filter out or substantially rectify the sensor measurement noise from the signals output by capacitive sensor 120.

Range filter 320 may be used to filter out the out-of-range noise from the signals output by the capacitive sensor. In embodiments, certain areas of the sides of a computing device may be designated as areas for sensing user gestures. As an example, the corresponding area of metal band 250 between first end 212 and second end 214 may be designated as the area for sensing finger gestures. However, other areas of the computing device may be touched unintentionally or need to be contacted purposefully, which all may induce output signals from capacitive sensor 120. As an example, a user may need to hold a smartphone in one hand while making finger gestures. As another example, there may be unintended body contact with the smartphone while it is stored, for example, in a pocket. In embodiments, different types of body contact with a computing device may induce different ranges of sensor data change or simply different ranges of signals, output by capacitive sensor 120, for example, due to different relationship between the body and transmitter-receiver electrodes 110. For instance, a palm touching the back of a smartphone may introduce distinct range of sensor data change comparing to a finger sliding along the edge of metal band 250. Thus, range filter 320 may be used to filter out or substantially remove the out-of-range noise from the signals output by capacitive sensor 120, for example, based on whether the signals are within the intended ranges of sensor data change or ranges of signals.

Jitter filter 330 may be used to filter out the jitter noise from the signals output by the capacitive sensor. In embodiments, jitter noise may include noise caused by irregular random movement of the body of a user. As an example, when a user attempts to hold a computing device steady in her hand, irregular random movement of her finger, hand, wrist, arm, elbow, should, etc., albeit subtle, may be picked up by capacitive sensor 120. As an example, when the user's finger is jittering along the proximity of the Tx/Rx electrodes, the output of the sensor signals from capacitive sensor 120 may indicate swift directional change of finger movement. Thus, jitter filter 330 may be used to filter out or substantially remove the jitter noise from the signals output by capacitive sensor 120.

Common mode filter 340 may be used to filter out the common mode noise and/or changes from the signals output by the capacitive sensor. In embodiments, common mode noise and/or changes may include common or parallel sensor data changes in multiple sensing channels corresponding to multiple receiver electrodes, i.e., common mode for multiple receiver electrodes. As an example, a finger sliding between Rx 220 and Rx 230 may generate opposite sensor data output in the two sensing channels of Rx 220 and Rx 230. However, a palm touching the whole area between Rx 220 and Rx 230 may effectively put the two sensing channels of Rx 220 and Rx 230 into a common mode with common or parallel sensor data changes. As another example, an isolated computing device disposed outside the vicinity of a user may naturally put the two sensing channels of Rx 220 and Rx 230 into a common mode. Since the common mode may not indicate any intended user gesture, common mode filter 340 may be used to filter out or substantially remove the common mode noise and/or changes from the signals output by capacitive sensor 120.

In embodiments, one or more filters described hereinabove may be used in any suitable sequence for signal processing. As an example, noise filters 310 may be chosen as the first line of filters for processing signals/data output by capacitive sensor 120. Then range filters 320 and/or jitter filters 330 may be further applied to the signals/data. Finally, common mode filters 340 may be additionally applied to clean up the signals/data. As another example, noise filters 310 may be chosen as the first line of filters for processing signals/data output by capacitive sensor 120. Then range filters 320 may be applied to the signals/data followed by the common mode filters 340. Finally the jitter filters 330 may be further applied to remove the unintended jittery movement.

Figure 4:
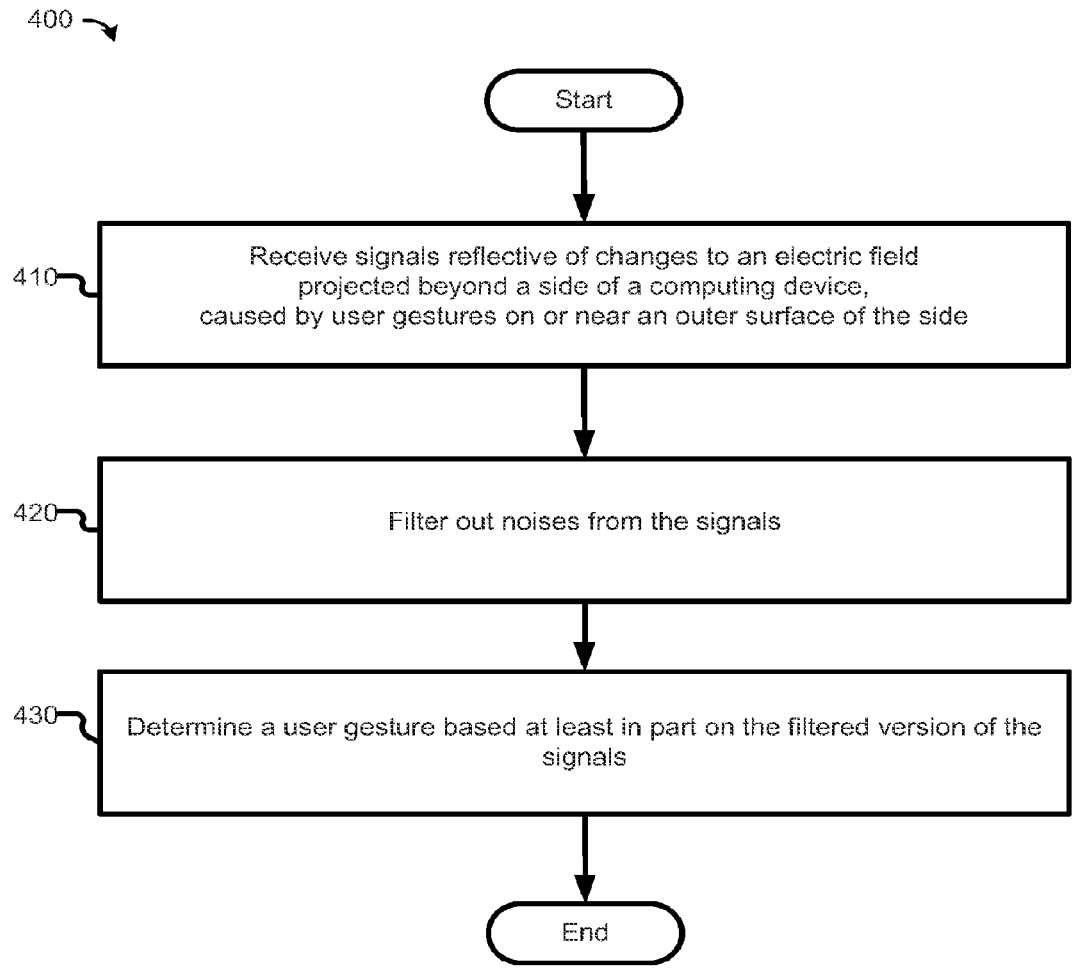
FIG. 4 is a flow diagram of an example process for detecting gestures on the side of a computing device, which may be practiced by an example apparatus, incorporating aspects of the present disclosure, in accordance with various embodiments.

Referring now to FIG. 4, it is a flow diagram of an example process for detecting gestures on the side of a computing device which may be practiced by an example apparatus incorporating aspects of the present disclosure, in accordance with various embodiments. As shown, process 400 may be performed by apparatus 100 to implement one or more embodiments of the present disclosure.

In embodiments, the process may begin at block 410, where signals reflective of changes to an electric field projected beyond a metal band disposed at the side of the computing device, caused by user gestures on or near an outer surface of the metal band, may be received, e.g., by capacitive sensor 120. In connection with FIG. 2, transmitter and/or receiver electrodes may be arranged and disposed near metal band 250, so that an electric field may be projected beyond metal band 250, thus causing user gestures outside of metal band 250 to be sensed via capacitive sensor 120.

Next, at block 420, various noises from the signals output by the capacitive sensor may be filtered out, e.g., by filters 130. In connection with FIG. 3, one or more filters may be used for signal processing to filter out various noises, such as power supply noises, jitter noises, common mode noises, etc. In embodiments, one or more filters may be combined or applied sequentially in processing signals output by capacitive sensor 120, thus various false positive signal changes received by capacitive sensor 120 may be filtered or substantially reduced in the filtered version of the signal. As an example, the pre-filtered data collected from a smartphone may be noisy due to the power supply noises and radio frequency noises, e.g., when the smartphone has been charged while keeping on its WiFi, GPS, 3G/4G connections. A smartphone enhanced by the present disclosure, on the contrary, may filter out or substantially reduce those noises, so that user gestures on the side of the smartphone may be correctly detected in connection with block 430.

Next, at block 430, a user gesture based at least in part on the filtered version of the signals may be determined, e.g., by gesture detector 140. In embodiments, various signal patterns may be predetermined and to be matched with the actual sensed signals. As an example, in connection with the description of FIG. 2, the whereabouts of a finger along metal band 250 may be determined. Similarly, the velocity and direction of the finger movement may also be determined. A signal pattern may then be established for indicating finger sliding from a position to another position along metal band 250. As another example, another signal pattern may be established for indicating finger tapping, including the location of tapping and the frequency or counts of tapping. In some embodiments, the post-filtered version signal output from filters 130 may be used to match against with a database of gesture signal patterns, thus a user gesture may be determined. In other embodiments, a new gesture may be dynamically formed in connection with the context of one or more active applications or the operating system running on the computing device. In embodiments, a detected user gesture may become an input to various active applications running on the computing device. Thus, a user may use gestures applied on the side of the computing device to control or interact with various applications or the operating system on the computing device.

Figure 5:
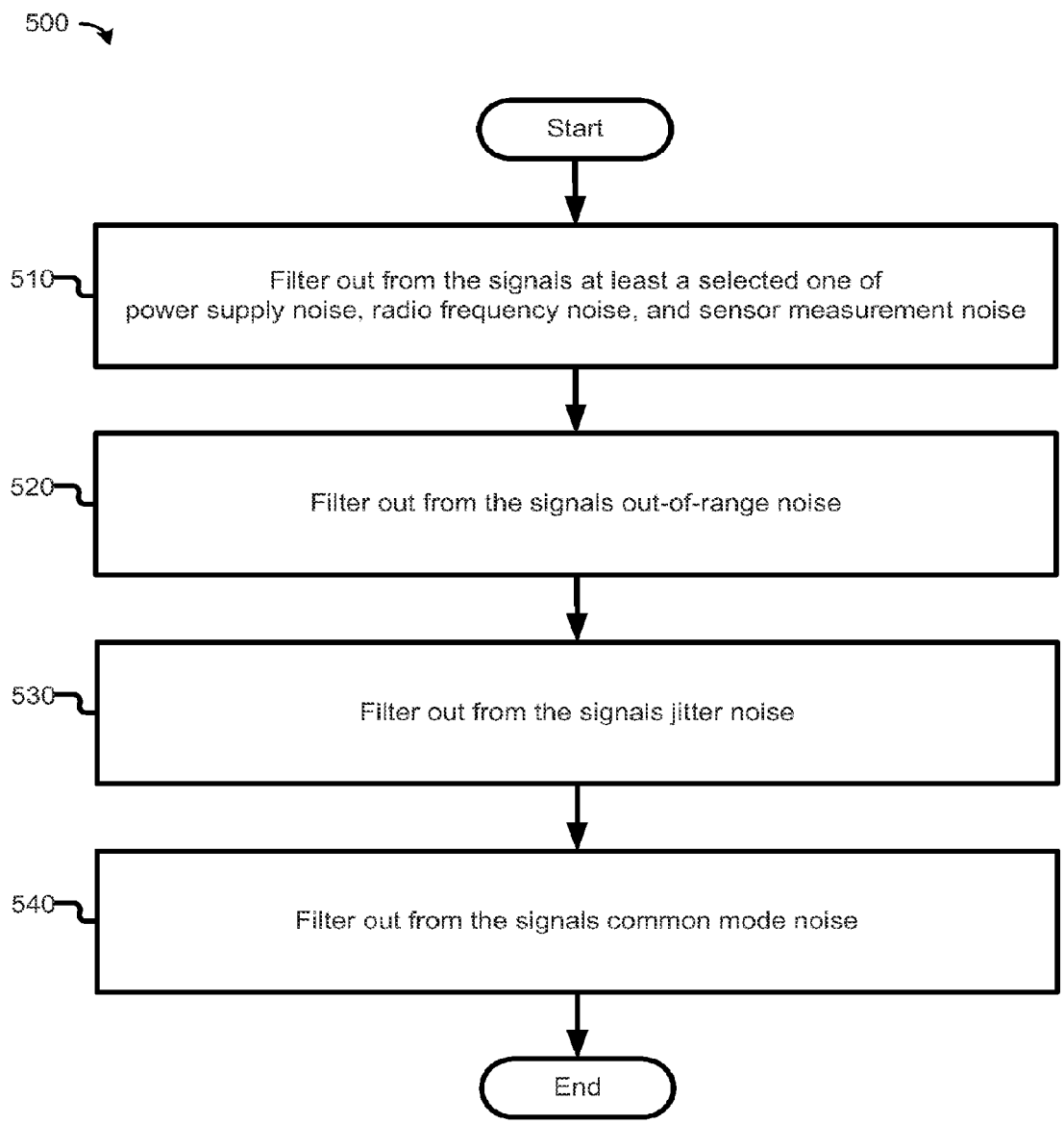
FIG. 5 is a flow diagram of an example process for signal processing, which may be practiced by an example apparatus, incorporating aspects of the present disclosure, in accordance with various embodiments.

Referring now to FIG. 5, it is a flow diagram of an example process for signal processing, which may be practiced by an example apparatus in accordance with various embodiments. As shown, process 500 may be performed by apparatus 100 to implement one or more embodiments of the present disclosure. In embodiments, process 500 may be performed in reference to block 420 in FIG. 4.

In embodiments, the process may begin at block 510, where at least a selected one of power supply noise, radio frequency noise, and sensor measurement noise may be filtered out from the signals output by capacitive sensor 120, e.g., by filters 130. Next, at block 520, out-of-range noise may be filtered out from the signals output by capacitive sensor 120, e.g., by filters 130. Next, at block 530, jitter noise may be filtered out from the signals output by capacitive sensor 120, e.g., by filters 130. Next, at block 540, common mode noise may be filtered out from the signals output by capacitive sensor 120, e.g., by filters 130. In embodiments, as discussed in connection with FIG. 3, various filters may be combined or arranged in any suitable order according to the particular embodiment of apparatus 100 to filter out or substantially remove various noises from the signals output by capacitive sensor 120. Thus, user gestures performed outside of metal bands of the computing device may be correctly determined.

Figure 6:
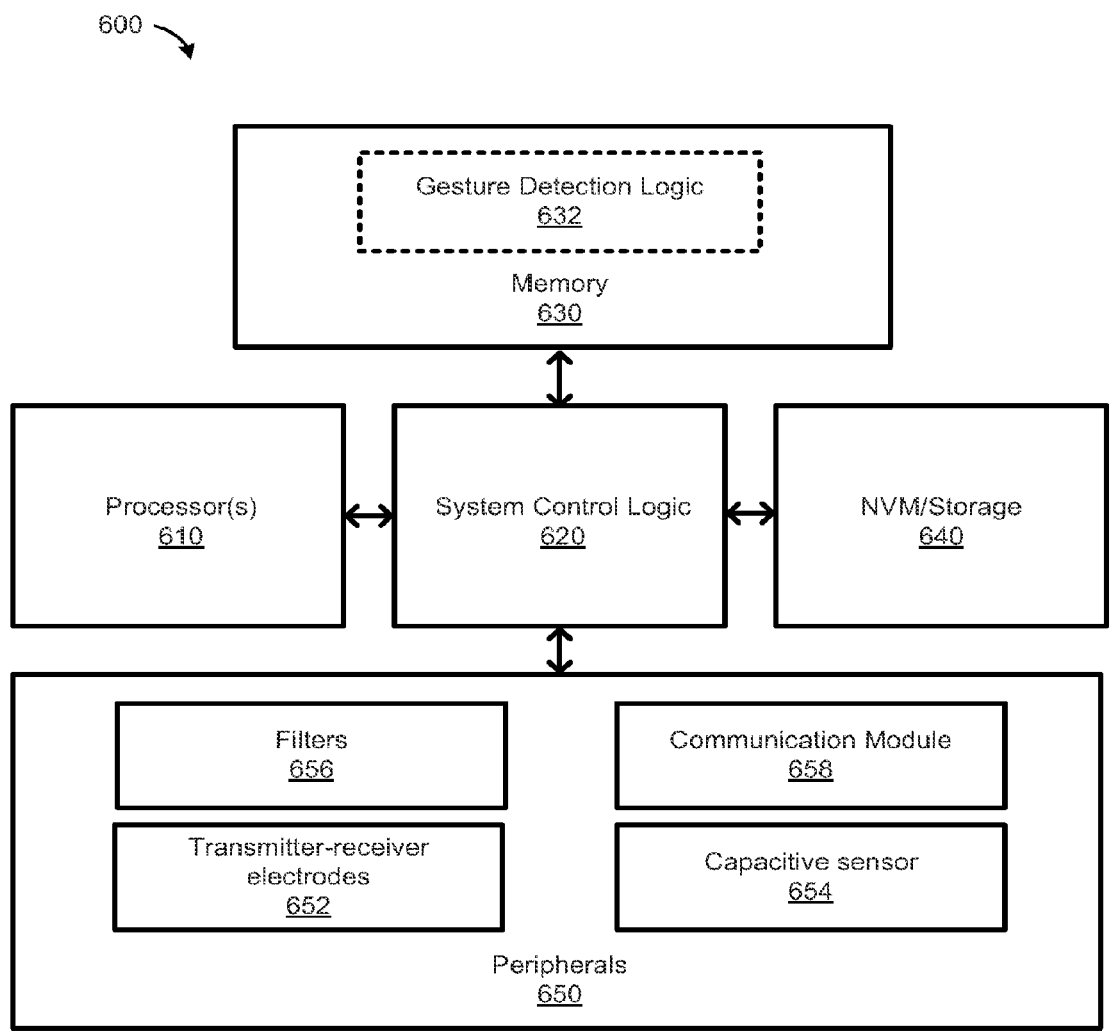
FIG. 6 illustrates an example computing device suitable for practicing the disclosed embodiments, in accordance with various embodiments.

FIG. 6 illustrates an embodiment of a computing device 600 suitable for practicing embodiments of the present disclosure. As illustrated, computing device 600 may include system control logic 620 coupled to one or more processor(s) 610, to system memory 630, to non-volatile memory (NVM)/storage 640, and to one or more peripherals 650. In various embodiments, the one or more processors 610 may include a processor core.

In embodiments, peripherals 650 may include transmitter-receiver electrodes 652, similar to earlier described transmitter-receiver electrodes 110 in connection with FIG. 1, which may be disposed in a particular arrangement, configured to enable projecting an electric field beyond one or more sides of computing device 600. In embodiments, a metal band may be disposed at each of the one or more sides of computing device 600. In embodiments, peripherals 650 may also include capacitive sensor 654, similar to earlier described capacitive sensor 120 in connection with FIG. 1. Capacitive sensor 654 may be electromagnetically coupled with computing device 600, configured to receive signals reflective of changes to the electric field near a side of computing device 600, e.g., caused by user gestures on or near an outer surface of the side, including when a metal band is disposed at the side. In embodiments, peripherals 650 may also include filters 656, similar to earlier described filters 130 in connection with FIG. 1, which may be coupled with computing device 600, configured to filter out or substantially reduce noises presented in the signals output by capacitive sensor 654.

Communication module 658 within peripherals 650 may provide an interface for computing device 600 to communicate over one or more network(s) and/or with any other suitable device. Communication module 658 may include any suitable hardware and/or firmware, such as a network adapter, one or more antennas, wireless interface(s), and so forth. In various embodiments, communication module 658 may include an interface for computing device 600 to use near field communication (NFC), optical communications, or other similar technologies to communicate directly (e.g., without an intermediary) with another device. In various embodiments, communication module 658 may interoperate with radio communications technologies such as, for example, Wideband Code Division Multiple Access (WCDMA), Global System for Mobile communications (GSM), LTE, Bluetooth®, Zigbee, and the like. In embodiments, communication module 658 may include a sensor interface, which enables computing device 600 to communicate with capacitive sensor 654 that is coupled with computing device 600.

In some embodiments, system control logic 620 may include any suitable interface controllers to provide for any suitable interface to the processor(s) 610 and/or to any suitable device or component in communication with system control logic 620. System control logic 620 may also interoperate with a display (not shown) for display of information, such as to a user. In various embodiments, the display may include one of various display formats and forms, such as, for example, liquid-crystal displays, cathode-ray tube displays, e-ink displays, projection displays. In various embodiments, the display may include a touch screen.

In some embodiments, system control logic 620 may include one or more memory controller(s) (not shown) to provide an interface to system memory 630. System memory 630 may be used to load and store data and/or instructions, for example, for computing device 600. System memory 630 may include any suitable volatile memory, such as suitable dynamic random access memory (DRAM), for example.

In some embodiments, system control logic 620 may include one or more input/output (I/O) controller(s) (not shown) to provide an interface to NVM/storage 640 and peripherals 650. NVM/storage 640 may be used to store data and/or instructions, for example. NVM/storage 640 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 640 may include a storage resource that is physically part of a device on which computing device 600 is installed or it may be accessible by, but not necessarily a part of, computing device 600. For example, NVM/storage 640 may be accessed by computing device 600 over a network via communication module 658.

In embodiments, system memory 630, NVM/storage 640, and system control logic 620 may include, in particular, temporal and persistent copies of gesture detection logic 632. The gesture detection logic 632 may include instructions that, when executed by at least one of the processor(s) 610, result in computing device 600 to detect user gestures performed by a user on the side of computing device 600, such as, but not limited to, processes 400 and 500.

In some embodiments, at least one of the processor(s) 610 may be packaged together with system control logic 620 and/or gesture detection logic 632. In some embodiments, at least one of the processor(s) 610 may be packaged together with system control logic 620 and/or gesture detection logic 632 to form a System in Package (SiP). In some embodiments, at least one of the processor(s) 610 may be integrated on the same die with system control logic 620 and/or gesture detection logic 632. In some embodiments, at least one of the processor(s) 610 may be integrated on the same die with system control logic 620 and/or gesture detection logic 632 to form a System on Chip (SoC). In some embodiments, the capacitive sensor 654 may be integrated on the same die with one or more of the processor(s) 610.

Depending on which modules of apparatus 100 in connection with FIG. 1 are hosted by computing device 600, the capabilities and/or performance characteristics of processors 610, system memory 630, and so forth, may vary. In various implementations, computing device 600 may be a smartphone, a tablet, a mobile computing device, a wearable computing device, etc., enhanced with the teachings of the present disclosure. In embodiments, the placement of the different modules in FIG. 6 and/or how they are clustered with other modules may be different from what is illustrated in FIG. 6. As an example, filters 656 may be implemented in memory 630, together with gesture detection logic 632.

Figure 7:
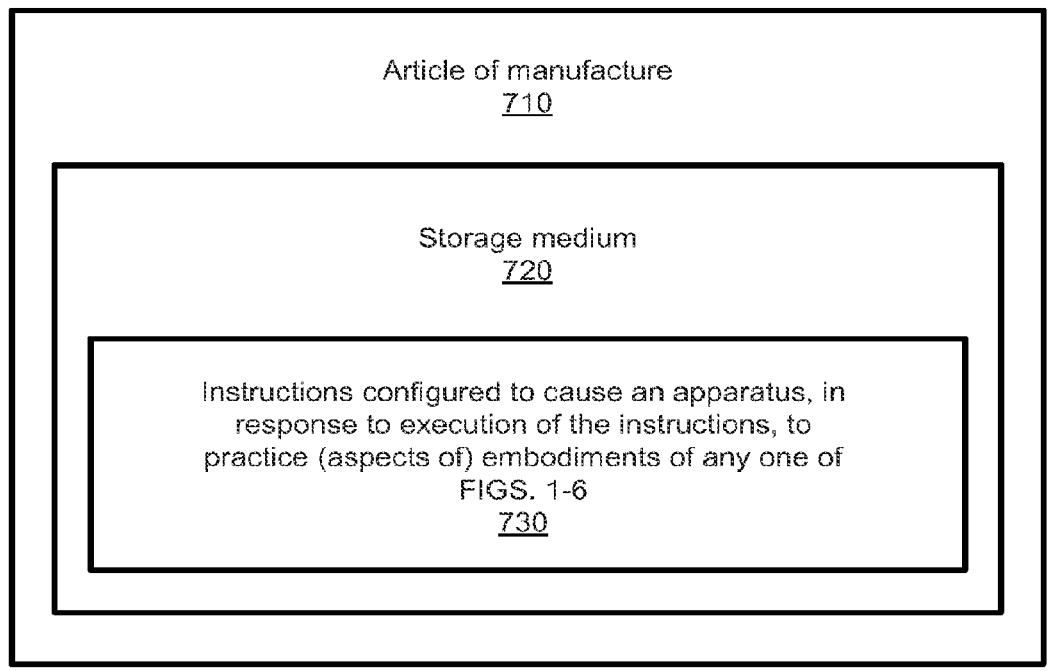
FIG. 7 illustrates an article of manufacture having programming instructions, incorporating aspects of the present disclosure, in accordance with various embodiments.

FIG. 7 illustrates an article of manufacture 710 having programming instructions, incorporating aspects of the present disclosure, in accordance with various embodiments. In various embodiments, an article of manufacture may be employed to implement various embodiments of the present disclosure. As shown, the article of manufacture 710 may include a computer-readable non-transitory storage medium 720 where instructions 730 configured to practice embodiments of or aspects of embodiments of any one of the processes described herein. The storage medium 720 may represent a broad range of persistent storage media known in the art, including but not limited to flash memory, dynamic random access memory, static random access memory, an optical disk, a magnetic disk, etc. Instructions 730 may enable an apparatus, in response to their execution by the apparatus, to perform various operations described herein. For example, storage medium 720 may include instructions 730 configured to cause an apparatus or system to practice some or all aspects of detecting gestures on the side of a computing device of the process 400 of FIG. 4 or process 500 of FIG. 5, in accordance with embodiments of the present disclosure. In embodiments, computer-readable storage medium 720 may include one or more computer-readable non-transitory storage medium. In other embodiments, computer-readable storage medium 720 may be transitory, such as signals, encoded with instructions 730.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. For example, as noted earlier, while for ease of understanding the disclosure hereinabove primarily described an apparatus with a metal band on the side to demonstrate various embodiments, this disclosure may also be embodied in an apparatus without a metal band on the side. Therefore, it is manifestly intended that embodiments described herein be limited only by the claims.

The following paragraphs describe examples of various embodiments.

Example 1 is an apparatus for detecting user gestures which may include a transmitter-receiver electrode arrangement to generate an electric field, wherein the transmitter-receiver electrode arrangement includes at least one transmitter electrode and at least one receiver electrode, to enable the electric field to project beyond a side of a computing device, and changes to the electric field caused by user gestures on or near an outer surface of the side to be sensed. The apparatus may also include a capacitive sensor disposed in the computing device, coupled with the transmitter-receiver electrode arrangement, to output electrical signals indicative of changes to the electric field sensed.

Example 2 may include the subject matter of Example 1, and further specifies that the transmitter-receiver electrode arrangement may include a transmitter electrode having an elongated body, disposed in parallel and adjacent to the inner surface of the side; and a first receiver electrode and a second receiver electrode respectively disposed adjacent to a first end and a second end of the transmitter electrode to output first and second signals, corresponding to respective changes to the electric field near the first end and the second end of the transmitter electrode.

Example 3 may include the subject matter of Example 2, and further specifies that the transmitter electrode may include an elongated wire, and is disposed substantially in parallel and, adjacent to the inner surface of the side.

Example 4 may include the subject matter of Example 2 or 3, and further specifies that each of the first and second receiver electrodes has a body that is substantially planar, and is disposed substantially in parallel to a back side of the computing device, and further inward from the inner surface of the side than the transmitter electrode.

Example 5 may include any one of Examples 1-4, and may further include a plurality of filters operatively coupled with the capacitive sensor to filter out from the signals output by the capacitive sensor, at least one of power supply noise, radio frequency noise, sensor measurement noise, out-of-range noise, jitter noise, or common mode noise, to output a filtered version of the signals output by the capacitive sensor.

Example 6 may include the subject matter of Example 5, and further specifies that the plurality of filters may include a noise filter operatively coupled with the capacitive sensor to filter out from the signals output by the capacitive sensor, a selected one of the power supply noise, the radio frequency noise, or the sensor measurement noise.

Example 7 may include the subject matter of Example 5 or 6, and further specifies that the plurality of filters may include a range filter operatively coupled with the capacitive sensor to filter out from the signals output by the capacitive sensor, the out-of-range noise.

Example 8 may include any one of Examples 5-7, and further specifies that the plurality of filters may include a jitter filter operatively coupled with the capacitive sensor to filter out from the signals output by the capacitive sensor, the jitter noise.

Example 9 may include any one of Examples 5-8, and further specifies that the plurality of filters may include a common mode filter operatively coupled with the capacitive sensor to filter out from the signals output by the capacitive sensor, the common mode noise.

Example 10 may include any one of Examples 5-9, and may further include a gesture detector operatively coupled with at least one of the plurality of filters to receive the filtered version of the signals output by the capacitive sensor, and to determine the user gestures, based at least in part on the filtered version of the signals.

Example 11 may include the subject matter of Example 10, and further specifies that the gesture detector may determine at least one of a direction of a finger sliding gesture, a distance of a finger sliding gesture, a velocity of a finger sliding gesture, a location of a finger tapping gesture, or a count of a finger tapping gesture.

Example 12 may include any one of Examples 1-11, and further specifies that the transmitter-receiver electrode arrangement is to enable the electric filed to project beyond a metal band disposed on the side of the computing device, and changes to the electric field caused by user gestures on or near an outer surface of the metal band to be sensed.

Example 13 may include any one of Examples 1-12, and further specifies that the apparatus is the computing device, and the computing device is a smartphone or a computing tablet.

Example 14 is a method for detecting user gestures on a side of a computing device which may include receiving signals reflective of changes to an electric field projected beyond a side of the computing device, caused by user gestures on or near an outer surface of the side; filtering out noises from the signals output by the capacitive sensor to output a filtered version of the signals; and determining a user gesture, based at least in part on the filtered version of the signals.

Example 15 may include the subject matter of Example 14, and may further include generating and projecting the electric field beyond the side, with a transmitter-receiver electrode arrangement disposed on an inner surface of the side; sensing, with the transmitter-receiver electrode arrangement and a capacitive sensor, changes to the electric field caused by user gestures on or near the outer surface of the side; and outputting, with the capacitive sensor, the signals reflective of the changes to the electric field sensed.

Example 16 may include the subject matter of Example 14 or 15, and further specifies that filtering may include filtering out from the signals output by the capacitive sensor, a selected one of power supply noise, radio frequency noise, and sensor measurement noise.

Example 17 may include the subject matter of any one of Examples 14-16, and further specifies that filtering may include filtering out from the signals output by the capacitive sensor, out-of-range noise.

Example 18 may include the subject matter of any one of Examples 14-17, and further specifies that filtering may include filtering out from the signals output by the capacitive sensor, jitter noise.

Example 19 may include the subject matter of any one of Examples 14-18, and further specifies that filtering may include filtering out from the signals output by the capacitive sensor, common mode noise.

Example 20 may include the subject matter of any one of Examples 14-19, and further specifies that determining may include determining a gesture of finger sliding.

Example 21 may include the subject matter of Example 20, and further specifies that determining a gesture of finger sliding may include determining a direction or a distance of the gesture of finger sliding.

Example 22 may include the subject matter of any one of Examples 14-21, and further specifies that determining may include determining a gesture of finger tapping.

Example 23 may include the subject matter of Example 22, and further specifies that determining a gesture of finger tapping may include determining a location or a frequency of the gesture of finger tapping.

Example 24 may include the subject matter of any one of Examples 14-23, and further specifies that receiving may include receiving signals reflective of changes to the electric field projected beyond a metal band on the side of the computing device, caused by user gestures on or near an outer surface of the metal band.

Example 25 is a computer-readable storage medium having stored therein instructions configured to cause a device, in response to execution of the instructions by the device, to practice the subject matter of any one of Examples 14-24. The storage medium may be non-transient.

Example 26 is an apparatus for detecting gestures on a side of a computing device which may include means to practice the subject matter of any one of Examples 14-24.

Example 27 is an apparatus for detecting gestures on a side of a computing device which may include means for projecting an electric field beyond a side of a computing device, including at least a pair of transmitter and receiver electrodes that are different, but complementary, in geometry and disposition, disposed relative to an inner surface of the side; means for sensing changes to the electric field caused by user gestures on or near an outer surface of the side; and means for outputting electrical signals indicative of changes to the electric field sensed.

Example 28 may include the subject matter of Example 27, and may further include means for filtering out from the electrical signals indicative of changes to the electric field sensed, a selected one of power supply noise, radio frequency noise, sensor measurement noise, out-of-range noise, jitter noise, or common mode noise; means for outputting a filtered version of the signals output by the capacitive sensor; and means for receiving the filtered version of the signals output by the capacitive sensor, and to determine the user gestures, based at least in part on the filtered version of the signals.

Example 29 may include the subject matter of Example 27 or 28, and further specifies that means for projecting may include means for projecting the electric field beyond a metal band disposed on the side of the computing device, and means for sensing changes to the electric filed caused by user gestures on or near the outer surface of the side including the metal band.

What is claimed is:
1. An apparatus, comprising:
a case having a side wall with an inner surface and an outer surface;
a metal band directly disposed along the inner surface of the side wall to serve as a wireless antenna of the apparatus;
a transmitter-receiver electrode arrangement to generate an electric field, wherein the transmitter-receiver electrode arrangement includes at least a pair of transmitter and receiver electrodes that are different, but complementary, in geometry and disposition, disposed inside the case, relative to the inner surface of the side wall, directly adjacent to the metal band, to project the electric field beyond the metal band and the side wall to outside the case; and a capacitive sensor disposed within the case, directly coupled with the transmitter-receiver electrode arrangement, to sense changes to the electric field caused by user gestures on or near the outer surface of the side wall, and to output electrical signals indicative of changes to the electric field sensed;

wherein the transmitter-receiver electrode arrangement comprises:

a transmitter electrode having an elongated body, disposed in parallel and directly adjacent to the metal band disposed along the inner surface of the side wall; and a first receiver electrode and a second receiver electrode respectively disposed directly adjacent to a first end and a second end of the transmitter electrode to output first and second signals, corresponding to respective changes to the electric field near the first end and the second end of the transmitter electrode.

2. The apparatus according to claim 1, wherein the transmitter electrode comprises an elongated wire, disposed substantially in parallel and adjacent to the metal band directly disposed along the inner surface of the side wall.

3. The apparatus according to claim 2, wherein each of the first and second receiver electrodes has a body that is substantially planar, and is disposed substantially in parallel to a back wall of the case, and further inward from the metal band directly disposed along the inner surface of the side wall than the transmitter electrode.

4. The apparatus according to claim 1, further comprising a plurality of filters operatively coupled with the capacitive sensor to filter out from the signals output by the capacitive sensor, a selected one of power supply noise, radio frequency noise, sensor measurement noise, out-of-range noise, jitter noise, or common mode noise, to output a filtered version of the signals output by the capacitive sensor.

5. The apparatus according to claim 4, wherein the plurality of filters comprises:

a noise filter operatively coupled with the capacitive sensor to filter out from the signals output by the capacitive sensor, a selected one of the power supply noise, the radio frequency noise, or the sensor measurement noise.

6. The apparatus according to claim 4, wherein the plurality of filters comprises:

a range filter operatively coupled with the capacitive sensor to filter out from the signals output by the capacitive sensor, the out-of-range noise.

7. The apparatus according to claim 4, wherein the plurality of filters comprises:

a jitter filter operatively coupled with the capacitive sensor to filter out from the signals output by the capacitive sensor, the jitter noise.

8. The apparatus according to claim 4, wherein the plurality of filters comprises:

a common mode filter operatively coupled with the capacitive sensor to filter out from the signals output by the capacitive sensor, the common mode noise.

9. The apparatus according to claim 4, further comprising:

a gesture detector operatively coupled with at least a final one of the plurality of filters to receive the filtered version of the signals output by the capacitive sensor, and to determine the user gestures, based at least in part on the filtered version of the signals.

10. The apparatus according to claim 9, wherein the gesture detector is to determine a selected one of a direction of a finger sliding gesture, a distance of a finger sliding gesture, a velocity of a finger sliding gesture, a location of a finger tapping gesture, or a count of a finger tapping gesture, performed at or near the outer surface of the side wall having the metal band that is directly disposed along the inner surface of the side wall.

11. The apparatus according to claim 1, wherein the apparatus is a smartphone or a computing tablet.

12. At least one non-transitory machine readable storage medium having a plurality of instructions to cause an apparatus, in response to execution of the plurality of instructions by the apparatus, to:

receive signals reflective of changes to an electric field projected beyond a metal band and a side wall of a case of the apparatus to outside the case, from inside the case, wherein the side wall has an inner surface and an outer surface, the metal band is directly disposed along the inner surface of the side wall and used as a wireless antenna of the apparatus, and the change to the electric field is caused by user gestures on or near the outer surface of the side wall;

filter out noises from the signals output by a capacitive sensor to output a filtered version of the signals; and determine a user gesture, based at least in part on the filtered version of the signals;

wherein the electric field is projected by a transmitter-receiver electrode arrangement of the apparatus, disposed directly adjacent to the metal band that is directly disposed along the inner surface of the side wall, that includes:

a transmitter electrode having an elongated body, disposed in parallel and directly adjacent to the metal band disposed along the inner surface of the side wall; and a first receiver electrode and a second receiver electrode respectively disposed directly adjacent to a first end and a second end of the transmitter electrode to output first and second signals, corresponding to respective changes to the electric field near the first end and the second end of the transmitter electrode.

13. The storage medium of claim 12, the instructions to further cause the apparatus to:

generate and project the electric field beyond the metal band and the side wall, with the transmitter-receiver electrode arrangement;

sense, with the transmitter-receiver electrode arrangement and a capacitive sensor, changes to the electric field caused by user gestures on or near the outer surface of the side wall; and output, with the capacitive sensor, the signals reflective of the changes to the electric field sensed.

14. The storage medium of claim 12, wherein filter comprises filter out from the signals output by the capacitive sensor, a selected one of power supply noise, radio frequency noise, and sensor measurement noise.

15. The storage medium of claim 12, wherein filter comprises filter out from the signals output by the capacitive sensor, out-of-range noise.

16. The storage medium of claim 12, wherein filter comprises filter out from the signals output by the capacitive sensor, jitter noise.

17. The storage medium of claim 12, wherein filter comprises filter out from the signals output by the capacitive sensor, common mode noise.

18. The storage medium of claim 12, wherein determine comprises determine a gesture of finger sliding, and a direction or a distance of the gesture of finger sliding performed at or near the outer surface of the side wall of the case of the apparatus having the metal band that is directly disposed along the inner surface of the side wall.

19. The storage medium of claim 12, wherein determine comprises determine a gesture of finger tapping, and a location or a frequency of the gesture of finger tapping performed near the outer surface of the side wall of the case of the apparatus having the metal band that is directly disposed along the inner surface of the side wall.

20. A method, comprising:
receiving a filtered version of signals reflective of changes to an electric field near an outer surface of a side wall of a computing device, wherein the electric field to projected from inside a case, beyond a metal band and the side wall to outside the case, wherein the metal band is directly disposed along an inner surface of the side wall and used as a wireless antenna of the computing device, wherein the changes to the electric field is caused by user gestures on or near the outer surface of the side wall, and wherein the filtered version of signals has at least a selected one of a power supply noise, a radio frequency noise, or a sensor measurement noise filtered; and
determining a user gesture, based at least in part on the filtered version of the signals;
wherein the electric field is projected by a transmitter-receiver electrode arrangement of the computing device, disposed directly adjacent to the metal band that is directly disposed along the inner surface of the side wall, that includes:
a transmitter electrode having an elongated body, disposed in parallel and directly adjacent to the metal band directly disposed along the inner surface of the side wall; and
a first receiver electrode and a second receiver electrode respectively disposed directly adjacent to a first end and a second end of the transmitter electrode to output first and second signals, corresponding to respective changes to the electric field near the first end and the second end of the transmitter electrode.

21. The method according to claim 20, determining comprises determining a gesture of finger sliding, and a direction or a distance of the gesture of finger sliding, performed at or near the outer surface of the side wall having the metal band that is directly disposed along the inner surface of the side wall.

22. The method according to claim 20, determining comprises determining a gesture of finger tapping, and a location or a frequency of the gesture of finger tapping, performed at or near the outer surface of the side wall having the metal band that is directly disposed along the inner surface of the side wall.

* * * * *